(12) United States Patent
Klein et al.

(10) Patent No.: US 9,490,614 B2
(45) Date of Patent: Nov. 8, 2016

(54) WIRE TRAY FOR A WIRE HARNESS

(71) Applicant: Tyco Electronics Corporation, Berwyn, PA (US)

(72) Inventors: David Allen Klein, Kernersville, NC (US); David Charles Strausser, Winston Salem, NC (US); Kevin John Peterson, Kernersville, NC (US)

(73) Assignee: TYCO ELECTRONICS CORPORATION, Berwyn, PA (US)

( * ) Notice: Subject to any disclaimer, the term of this patent is extended or adjusted under 35 U.S.C. 154(b) by 295 days.

(21) Appl. No.: 14/253,599

(22) Filed: Apr. 15, 2014

(65) Prior Publication Data

US 2014/0224520 A1 Aug. 14, 2014

(51) Int. Cl.
*H02G 3/04* (2006.01)
*B60R 16/02* (2006.01)

(52) U.S. Cl.
CPC ......... *H02G 3/0437* (2013.01); *B60R 16/0215* (2013.01); *H02G 3/0418* (2013.01)

(58) Field of Classification Search
CPC .... H02G 3/04; H02G 3/0437; H02G 3/0418; H02G 3/0406; B60R 16/02; B60R 16/0215; B60R 16/0207; F16L 57/00
USPC ........ 174/68.1, 68.3, 72 A, 481, 72 R, 88 R, 174/70 C, 95; 248/49, 68.1; 138/92, 111, 138/118; 439/207
See application file for complete search history.

(56) References Cited

U.S. PATENT DOCUMENTS

| | | | |
|---|---|---|---|
| 4,891,471 A * | 1/1990 | Ono .................... | H02G 3/0418 174/68.3 |
| 4,951,716 A * | 8/1990 | Tsunoda .............. | H02G 3/0418 174/68.3 |
| 6,126,123 A | 10/2000 | Yang | |
| 6,878,879 B2 * | 4/2005 | Takahashi ............ | H02G 3/0418 174/72 A |
| 7,038,133 B2 * | 5/2006 | Arai ..................... | H02G 3/0418 174/72 A |
| 7,964,796 B2 * | 6/2011 | Suzuki ................ | B60R 16/0215 174/72 A |
| 8,188,368 B2 * | 5/2012 | Suzuki ................ | B60R 16/0215 174/72 A |
| 8,575,487 B2 * | 11/2013 | Agusa .................. | H02G 3/0487 174/68.3 |
| 2005/0217888 A1 | 10/2005 | Arai et al. | |
| 2005/0241715 A1 | 11/2005 | Suzuki et al. | |

FOREIGN PATENT DOCUMENTS

| | | |
|---|---|---|
| JP | H0851714 A | 2/1996 |
| JP | H0928014 A | 1/1997 |
| JP | 2004166454 A | 6/2004 |

OTHER PUBLICATIONS

International Search Report, International Application No. PCT/US2015/025027, International Filing Date, Apr. 9, 2015.

* cited by examiner

*Primary Examiner* — Angel R Estrada

(57) ABSTRACT

A wire tray configured to support and route wires of a wire bundle between electrical components includes tray walls defining a channel configured to receive corresponding wires of the wire bundle. The tray walls includes a first side wall, a second side wall opposite the first side wall and a bottom wall extending between the first and second side walls. A cover is hingedly coupled to the first side wall. The cover extends across a top of the channel between the first and second side walls. The cover has a primary latch latchably coupled to the second side wall. The cover has a secondary latch engaging the first side wall to secure the cover to the first side wall.

24 Claims, 5 Drawing Sheets

WIRE TRAY FOR A WIRE HARNESS

BACKGROUND OF THE INVENTION

The subject matter herein relates generally to wire harness support systems.

Wire harnesses have many uses, such as for interconnecting an engine control unit with fuel injectors of a diesel engine. In some applications, the wire harness includes a wire tray that supports wires of a wire bundle. In some applications, the wire tray is mounted to the engine and directs the wires between the engine control unit and the fuel injectors. Such wire harness support systems are not without disadvantages. For instance, the wire trays use separate wire retention clips that are inserted into pockets in the tray. The clips can be pulled out of the tray if the wire bundle is pulled on too hard, causing loose parts to be present around the working parts of the engine. Damage to the engine could result. Also, the wires may be easily removed from the tray after the clips are removed, which could lead to damage to the wires. Additionally, current tray designs have problems with the tray sliding on the wire bundle, such as during shipping, handling and assembly. Another problem with existing wire harness designs is that long lengths of the wires exit the tray for termination to the fuel injectors. The exposed wires are susceptible to damage, such as from the moving parts of the engine.

A need remains for a wire harness having few loose parts, which may be secured to the wire bundle and that protects the wires from damage.

BRIEF DESCRIPTION OF THE INVENTION

In one embodiment, a wire harness is provided including a wire tray configured to support and route wires of a wire bundle between electrical components. The wire tray includes tray walls defining a channel configured to receive corresponding wires of the wire bundle. The tray walls includes a first side wall, a second side wall opposite the first side wall and a bottom wall extending between the first and second side walls. A cover is hingedly coupled to the first side wall. The cover extends across a top of the channel between the first and second side walls. The cover has a primary latch latchably coupled to the second side wall. The cover has a secondary latch engaging the first side wall to secure the cover to the first side wall.

In another embodiment, a wire harness is provided that includes a wire bundle having a plurality of wires connected between corresponding electrical components. A wire tray receives the wire bundle. The wire tray includes tray walls defining a channel receiving and routing the wires therein. The tray walls include a first side wall and a second side wall opposite the first side wall with a bridge spanning the channel between the first and second side walls. The bridge is recessed below a top of the channel. A cover extends across the top of the channel between the first and second side walls. The cover is positioned over the bridge. The cover has a protrusion extending into the channel below the top of the channel. The wires are captured between the protrusion and the bridge.

In a further embodiment, a wire harness is provided that includes a wire bundle having a plurality of wires connected between corresponding electrical components. A wire tray receives the wire bundle. The wire tray includes tray walls defining a channel receiving and routing the wires therein. The tray walls include a first side wall, a second side wall opposite the first side wall and a bottom wall extending between the first and second side walls. A cover extends across the top of the channel between the first and second side walls. Wire cradles extending from the bottom wall. Each wire cradle has a cradle channel open to the channel. The cradle channel is open at a front of the wire cradle. Each wire cradle receives a corresponding wire of the wire bundle and routes the wire below the bottom wall for termination to the corresponding electrical component.

DETAILED DESCRIPTION OF THE INVENTION

Figure 1:
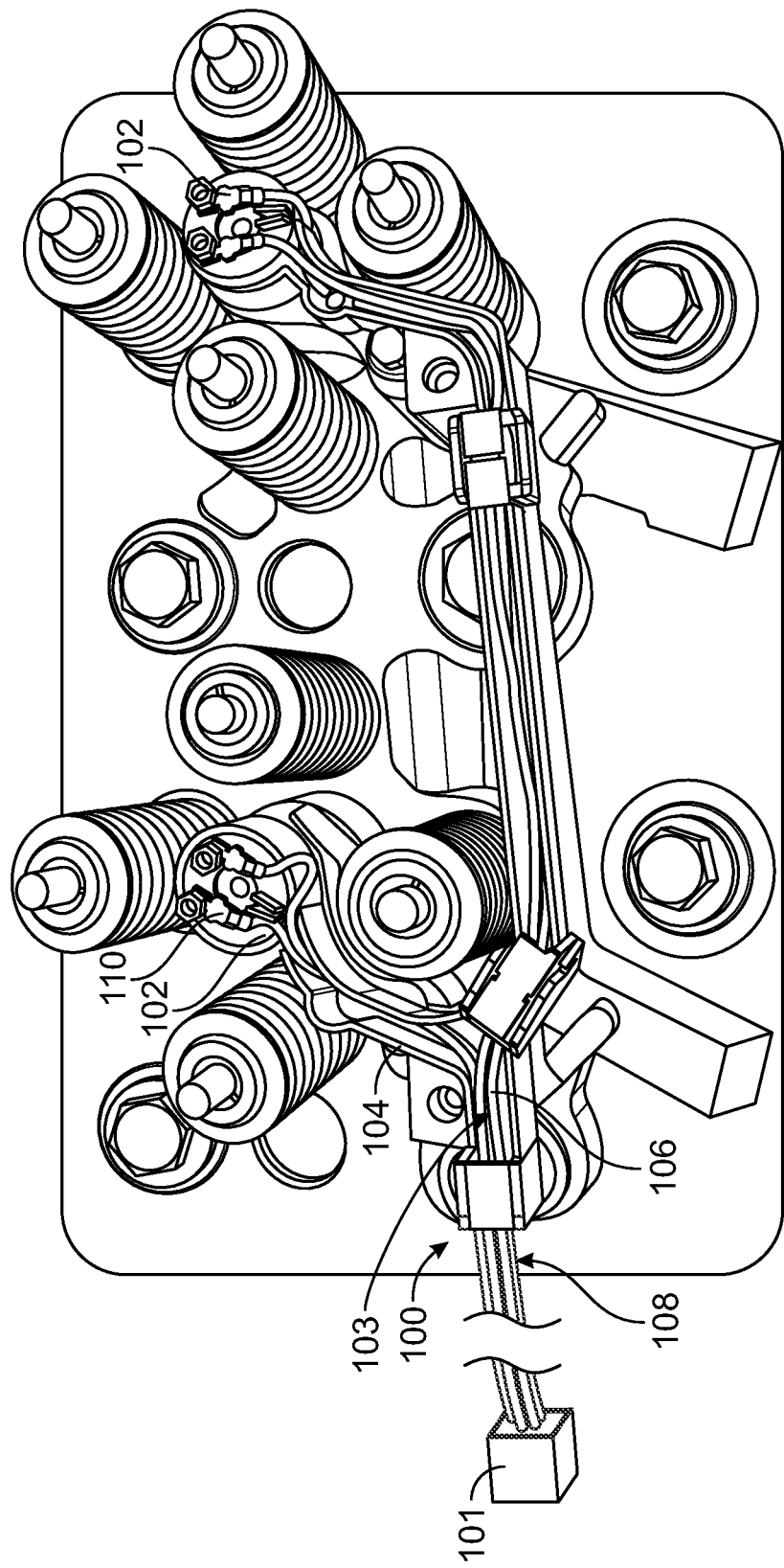
FIG. 1 illustrates a wire harness assembly including a wire bundle and a wire tray supporting the wire bundle and formed in accordance with an exemplary embodiment.

FIG. 1 illustrates a wire harness assembly 100 formed in accordance with an exemplary embodiment. In the exemplary embodiment, the wire harness assembly 100 is used to electrically connect an engine control unit connector 101 with electrical components 102. The wire harness assembly 100 comprises a wire harness 103 and a wire tray 104. The wire tray 104 supports and routes wires 106 of the wire harness 103, which may be arranged as a wire bundle 108, between corresponding electrical components 101, 102. The wire harness 103 includes terminals 110 terminated to ends of the wires 106, which may be terminated to the electrical components 101, 102. The wires 106 may be connected between any type of electrical components 102. In the illustrated embodiment, the wires 106 electrically connect an engine control unit with fuel injectors of an engine. The wire tray 104 is configured to be mounted to the engine and route the wires 106 to different areas of the engine, such as for terminating to the fuel injectors. The wire harness assembly 100 may be used in other application in alternative embodiments.

Embodiments described herein provide features within the wire tray 104 to securely retain the wires 106 within the wire tray 104. Slippage of the wire tray 104 along the wires 106 is reduced or minimized. Embodiments described herein provide features within the wire tray 104 that protect and position the wires 106 for termination to the electrical components 102. For example, the wire tray 104 reduces the amount of the wires 106 exposed to the exterior of the wire tray 104 that protects the wires 106 from any moving parts that may be near the fuel injectors. Embodiments described herein reduce the number of discrete pieces reducing the risk of loose pieces within the engine and foreign object damage (FOD).

Figure 2:
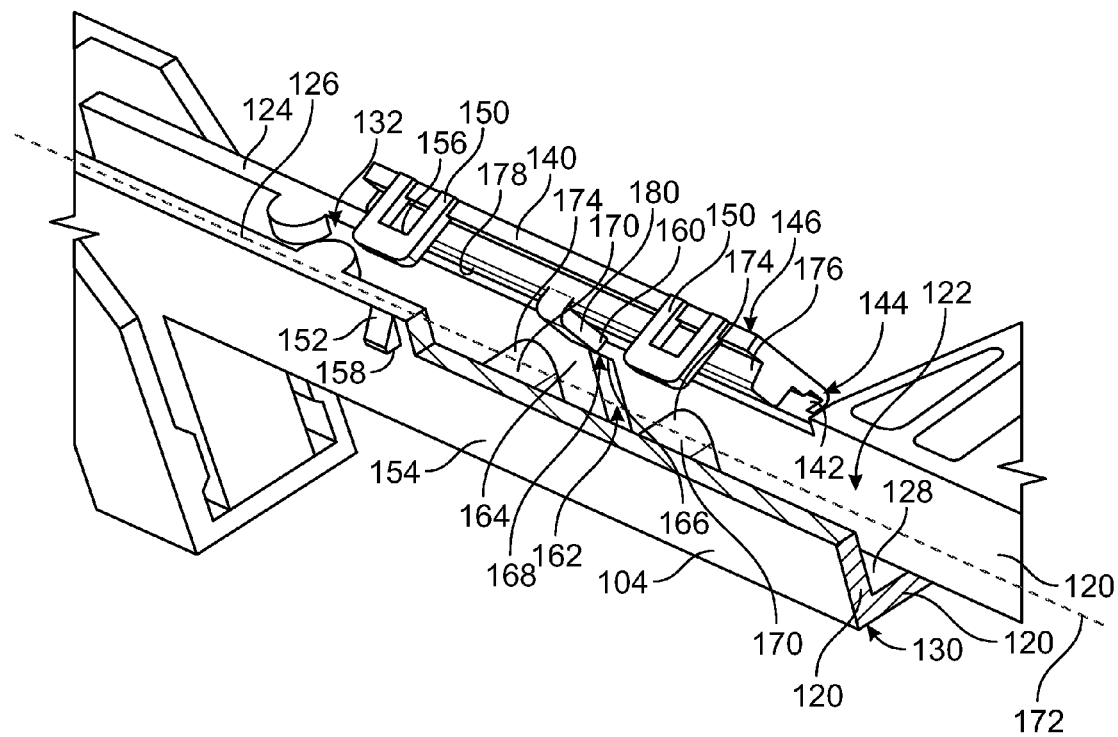
FIG. 2 is a top perspective view of a portion of the wire tray formed in accordance with an exemplary embodiment.

FIG. 2 is a top perspective view of a portion of the wire tray 104 formed in accordance with an exemplary embodiment. The wire tray 104 includes a plurality of tray walls 120 that define a channel 122 that receives the wires 106 of the wire bundle 108. The tray walls 120 include a first side wall 124, a second side wall 126 opposite the first side wall 124, and a bottom wall 128 extending between the first and second sidewalls 124, 126 at a bottom 130 of the wire tray 104. The channel 122 may be open at a top 132 of the channel 122 along significant portions of the channel 122. The wires 106 may be loaded into the channel 122 through the open top 132.

The wire tray 104 includes one or more covers 140 coupled to the tray walls 120. In an exemplary embodiment, the cover 140 is hingedly coupled to the first side wall 124 by a living hinge(s) 142. In an exemplary embodiment, the cover 140 and tray walls 120 are made of the same dielectric material. Optionally, the cover 140 may be co-molded and integral with the first side wall 124. The cover 140 may be rotated about the living hinge 142 between an open position and a closed position. The wires 106 may be loaded into the channel 122 when the cover 140 is in the open position. The cover 140 restricts removal of the wires 106 from the channel 122 in the closed position. The cover 140 extends between a first side 144 and a second side 146. The living hinge 142 is provide at the first side 144 and connects the first side 144 to the first side wall 124.

In an exemplary embodiment, one or more primary latches 150 extend from the second side 146 to latchably couple the cover 140 to the second side wall 126. The primary latches 150 are configured to engage corresponding latches 152 on an exterior 154 of the second side wall 126. Optionally, the primary latch 150 may be deflectable and may be released from the latch 152 to open the cover 140. In the illustrated embodiment, the primary latch 150 is "U" shaped and includes a latching surface 156 that engages a catch surface 158 of the corresponding latch 152. The primary latch 150 may have other shapes or features in alternative embodiments.

In an exemplary embodiment, the cover 140 includes a secondary latch 160 used to secure the first side 144 of the cover 140 to the first side wall 124. The secondary latch 160 serves as a backup or secondary securing feature to the hinge 142. For example, if the hinge 142 were to fail or break, the secondary latch 160 secures the first side 144 of the cover 140 to the first side wall 124. In an exemplary embodiment, the secondary latch 160 is received in a slot 162 in the first side wall 124. The slot 162 is open to the channel 122 along an interior 164 of the first side wall 124. The first side wall 124 includes a shoulder 166 and a top 168 of the slot 162.

When the cover 140 is closed, the secondary latch 160 is received in the slot 162 below the shoulder 166. The shoulder 166 blocks the secondary latch 160 from emerging from the slot 162. When the cover 140 is closed, the primary latch 150 stops vertical movement of the second side 146 of the cover 140 and the secondary latch 160 stops vertical movement of the first side 144 of the cover 140. The hinge 142 may also stop vertical movement of the first side 144 of the cover 140. As such, when the cover 140 is closed, the cover 140 is locked to the tray walls 120 and is unable to open without releasing the primary latches 150.

Figure 3:
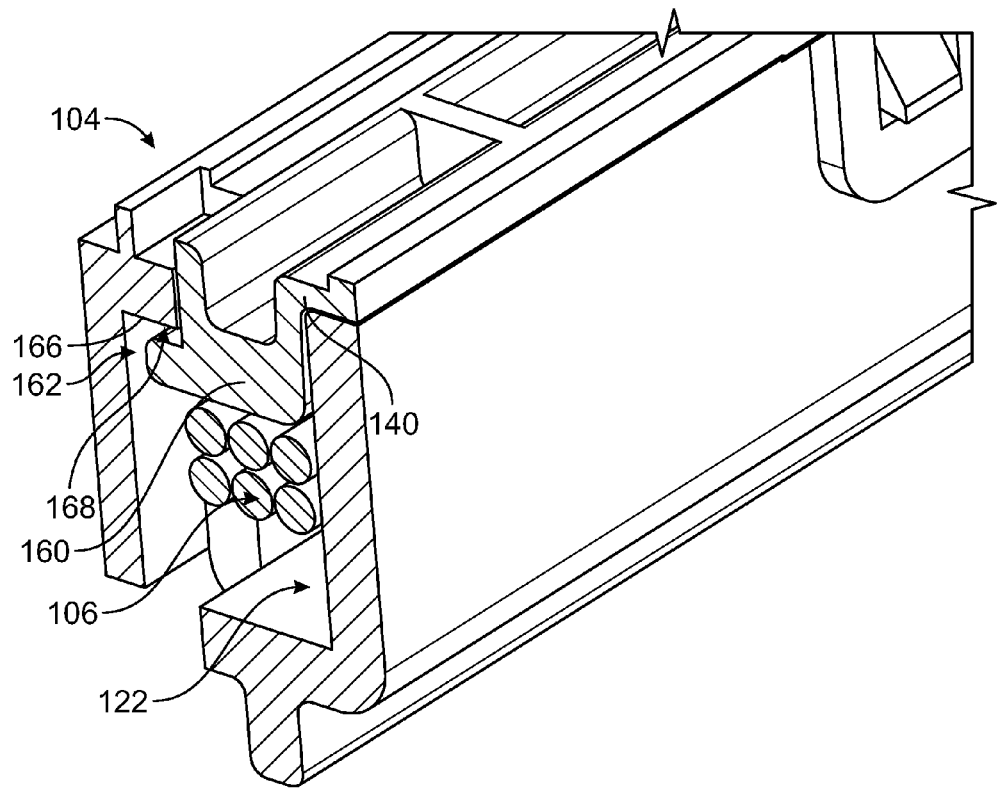
FIG. 3 is a cross sectional view of a portion of the wire tray showing an enclosed wire bundle.

FIG. 3 is a cross sectional view of a portion of the wire tray 104 with the cover 140 in the closed position showing the wires 106 located within the channel 122. The cover 140 holds the wires 106 in the channel 122. FIG. 3 illustrates the secondary latch 160 in the slot 162. The secondary latch 160 is positioned below the shoulder 166 at the top 168 of the slot 162. The shoulder 166 blocks the secondary latch 160 from moving in a vertical direction, and thus stops the cover 140 from opening.

Returning to FIG. 2, the wire tray 104 includes one or more bridges 170 spanning the channel 122 between the first and second side walls 124, 126. In the illustrated embodiment, two bridges are illustrated, representing first and second bridges 170. The first and second bridges 170 are axially offset along a longitudinal axis 172 of the channel 122 with respect to one another. Each bridge 170 has an upper surface 174. Optionally, the upper surface 174 may be curved. The upper surface 174 is recessed below the top 132 of the channel 122.

The upper surface 174 is elevated above the bottom wall 128. The wires 106 are configured to be routed in the space between the upper surface 174 and the top 132 of the channel 122. In an exemplary embodiment, the wires 106 may be dressed along the upper surface 174 such that a frictional force between the wires 106 and the upper surface 174 of the bridge 170 reduces slippage or relative movement between the wires 106 and the wire tray 104. Optionally, the wires 106 may be captured between the cover 140 and the upper surface 174 of the bridge 170 in an interference fit to hold the relative position of the wires 106 with respect to the wire tray 104. The interference fit reduces tray movement of the wire tray 104 along the wire bundle 108 (shown in FIG. 1).

In an exemplary embodiment, the cover 140 includes a rail 176 along a bottom 178 of the cover 140. The rail 176 is received in the channel 122 and extends below the top 132 of the channel 122. The wires 106 may be captured between the rail 176 and the upper surface 174 of the bridge 170. Optionally, the wires 106 may be at least partially compressed between the rail 170 and the upper surface 174 of the bridge 170.

In an exemplary embodiment, the cover 140 includes a protrusion 180 extending into the channel 122 below the top 132 of the channel 122. The protrusion 180 may define the secondary latch 160. Alternatively, the secondary latch 160 may extend from the protrusion 180 or may extend from another portion of the rail 176 and/or cover 140. The protrusion 180 extends below the rail 176. Optionally, the wires 106 are configured to be captured between the protrusion 180 and the bridge 170. For example, the wires 106 may have to bend along a serpentine path or sine wave path over the bridges 170 and under the protrusion 180. The portions of the wires 126 between the bridges 170 and the protrusion 180 may be angled transverse with respect to the longitudinal axis 172 of the channel 122. Having the wires 106 follow the serpentine path or sine wave path through the channel 122 from the bridges 170 to the protrusion 180 may reduce slippage or movement of the wire tray 104 relative to the wires 106. The wires 106 may be captured between the bridges 170 and the protrusion 180 by an interference fit.

Figure 4:
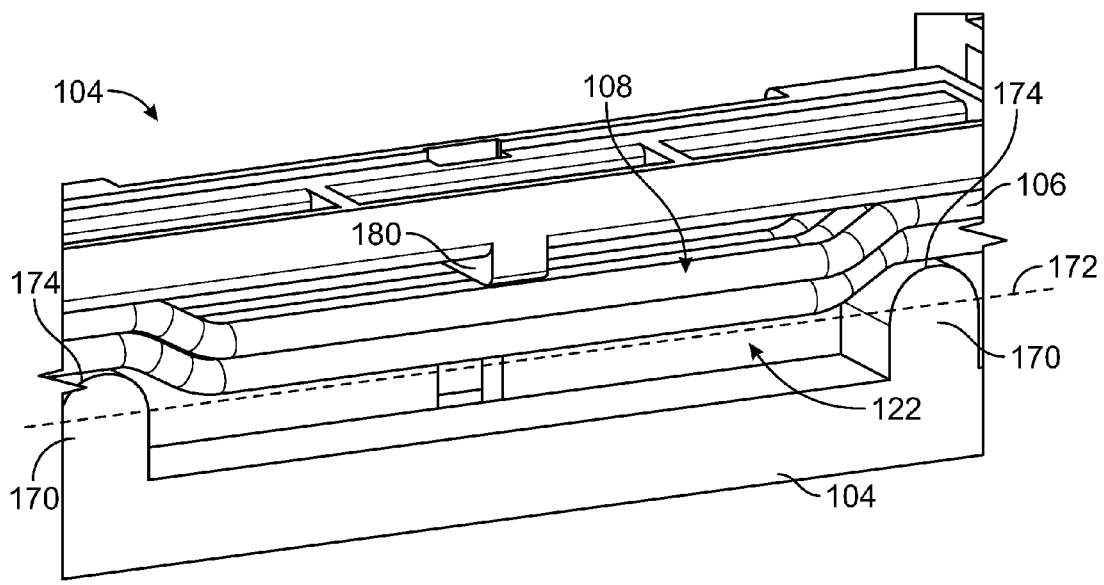
FIG. 4 is a cross sectional view of a portion of the wire tray and wire bundle.

FIG. 4 is a cross sectional view of a portion of the wire harness assembly 100 showing the wires 106 of the wire harness 101 in the channel 122 of the wire tray 104. The wires 106 pass over the upper surface 174 of the bridge 170 and pass under the protrusion 180. Optionally, the protrusion 180 may be approximately axially centered between the first and second bridges 170. Any number of bridges 170 and protrusions 180 may be provided to increase the number of bends in the wires 106, which may increase the friction between the wire tray 104 and the wires 106.

Optionally, the portions of the wires 106 passing over the bridge 170 are vertically above the corresponding portions of the wires 106 passing under the protrusion 180. Forcing the wires 106 into the serpentine or sine wave path within the channel 122 helps to lock the relative position of the wire tray 104 along the wire bundle 108. Having the wires 106 bent or angled transverse to the longitudinal axis 172 increases friction between the wires 106 and the wire tray 104 which reduces slippage of the wire tray 104 along the wire bundle 108 or the slippage of the wires 106 within the wire tray 104.

Figure 5:
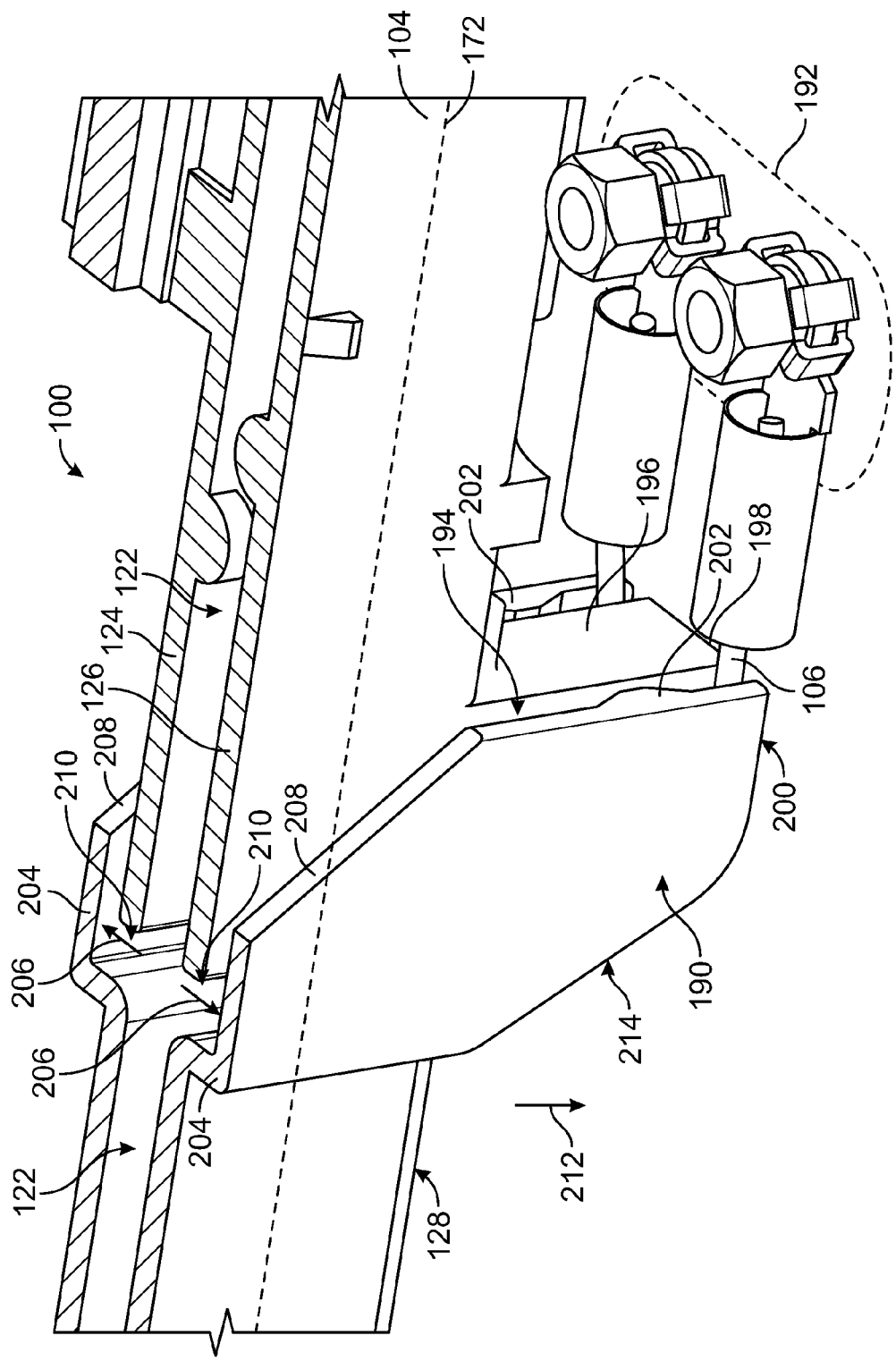
FIG. 5 is a perspective view of a portion of the wire tray.

FIG. 5 is a perspective view of a portion of the wire harness assembly 100 showing the wires 106 extending to an exterior of the wire tray 104. The wire tray 104 includes one or more wire cradles 190 extending below the bottom wall 128. The cradles 190 are used to transition the wires 106 from the channel 122 to a wire termination area 192 exterior of the wire tray 104. The cradle 190 includes one or more cradle channel 194 that transition the wires 106 from the channel 122 to the wire termination area 192. In the illustrated embodiment, two cradle channels 194 are provided. Optionally, each cradle channel 194 may receive a single wire 106. Alternatively, the cradle channels 194 may receive more than one wire 106.

Each cradle channels 194 are open to the channel 122. The cradle channel 194 is open at a front 196 of the wire cradle 190. The wires 106 may extend forward from the front 196 through the corresponding opening at the front 196. The cradle channel 194 routes the wire 106 below the bottom wall 128 for termination to the corresponding electrical component 102 (shown in FIG. 1). In an exemplary embodiment, the cradle 190 includes a base wall 198 at a bottom 200 of the cradle 190. The base wall 198 is vertically offset below the bottom wall 128 of the channel 122. Having the base wall 198 below the bottom wall 128 allows the wires 106 to transition out of the channel 122 to an area below the wire tray 104 where the wire 106 may be terminated to the electrical component 102. The cradle 190 protects the wires 106 as the wires 106 transition from the channel 122 to the wire termination areas 192. The cradle 190 covers the wire 106 to limit the lengths of wires 106 exposed to the environment, which may have moving parts (e.g. of the engine), which could sever or damage the wires 106. The cradle 190 includes retention tabs 202 across the front 196 of the cradle channels 194 to capture the wires 106 in the cradle channel 194. Optionally, the wires 106 may be captured below the retention tabs 202. For example, the wires 106 may be captured between the retention tabs 202 and the base wall 198. The retention tabs 202 control a vertical position of the wires 106.

The cradles 190 are wider than the side walls 124, 126 of the wire tray 104 to allow the wires 106 to transition out of the channel 122. For example, the cradle 190 includes lateral walls 204 that transition from the side walls 124, 126 in an outward, lateral direction 206 that is generally perpendicular to the longitudinal axis 172. The lateral walls 204 extend to outer walls 208 of the cradle 190. The outer walls 208 may be generally parallel to, and offset outward of, the sidewalls 124, 126. The outer walls 208 extend below the bottom wall 128 to the base wall 198. The cradle channels 194 are defined between the outer walls 208 and the side walls 124, 126.

The cradle channels 194 have transition channels 210 that transition laterally from the channel 122 to the cradle channels 194. The wires 106 are routed from the channel 122, through the transition channels 210 to the cradle channels 194. In an exemplary embodiment, the wires 106 make a double bend from the channel 122, through the transition channels 210, into the corresponding cradle channels 194. The cradle channels 194 extend generally parallel to the longitudinal axis 172, and thus parallel to the channel 122, however the cradle channels 194 are laterally offset outside of the channel 122.

Having the wires 106 bent from the channel 122 into the transition channel 210 helps maintain the position of the wire tray 104 along the wire bundle 108 and the bent wires 106 within the wire tray 104. For example, the wire tray 104 is stopped from sliding or moving along the wire bundle 108 by the bend in the wire 106 from the channel 122 to the transition channel 210. Additionally, having the wires 106 bent again from the transition channels 210 to the cradle channels 194 helps to hold the relative position of the wire tray 104 with respect to the wire bundle 108. For example, the first bend stops slipping in a first longitudinal direction and the second bend stops slipping in a second longitudinal direction opposite the first longitudinal direction. The wires 106 may engage the surfaces of the wire cradle 190 to create a friction between the wire tray 104 and the wires 106, which may reduce slippage or movement between the wire tray 104 and the wires 106. Additionally, having the wires 106 transition in a vertical direction 212 in the cradle channels 194 provides additional resistance to slippage of the wire tray 104 on the wire bundle 108. For example, the wires 106 may rest on a back wall 214 of the cradle 190 to stop forward slippage of the wire tray 104 on the wire bundle 108. The wires 106 may frictionally engage the back wall 214 to stop slippage of the wire tray 104 along the wires 106. Having the wires 106 bent in the cradle channels 194 in both a horizontal direction and a vertical direction helps maintain the position of the wire tray 104 along the wire bundle 108.

Figure 6:
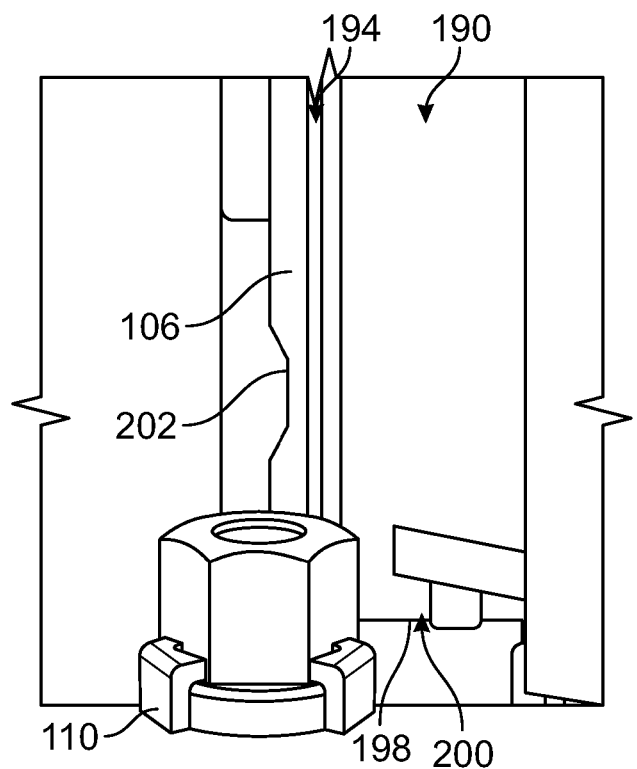
FIG. 6 is a front view of a portion of the wire tray.

FIG. 6 is a front view of a portion of the cradle 190. The wire 106 is shown in the cradle channel 194. The retention tab 202 holds the wire 106 in the cradle channel 194. The retention tab 202 ensures that the wire 106 remains in the cradle channel 194. The retention tab 202 ensures that the wire 106 stays in proper position (e.g. horizontally and/or vertically) generally at the bottom 200 of the cradle 190. For example, the retention tab 202 limits vertically upward movement of the wire 106 and terminal 110 terminated to the end of the wire 106. The location where the wire 106 exits the cradle channel 194 may be approximately coplanar with the wire termination area 192 (shown in FIG. 5). The base wall 198 may be approximately coplanar with the electrical component 102 (shown in FIG. 1).

Figure 7:
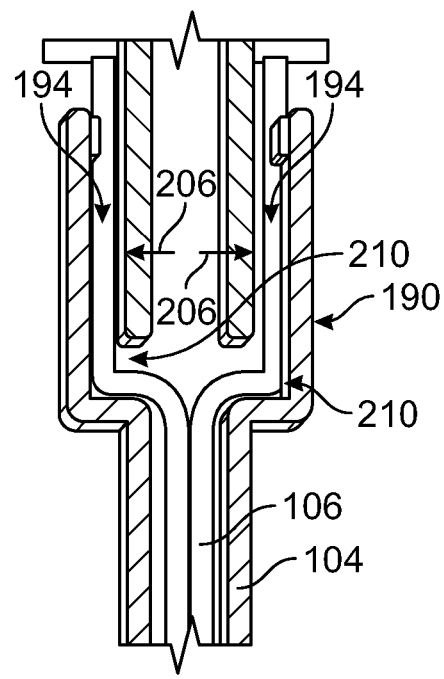
FIG. 7 is a top view of a portion of the wire tray and enclosed wires.

FIG. 7 is a top view of a portion of the wire tray 104 showing the wires 106 routed into the cradle 190. FIG. 7 illustrates the wires 106 transitioning in the lateral directions 206 into the transition channels 210. The wires 106 are also bent forward in the cradle channels 194 from the transition channels 210. The double bend in the wires 106 properly positions the wires 106 in the wire termination areas 192 (shown in FIG. 5) and helps hold the wire tray 104 in position on the wire bundle 108 (shown in FIG. 1).

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. §112(f), unless and until such claim limitations expressly use the phrase "means for" followed by a statement of function void of further structure.

What is claimed is:

1. A wire harness tray configured to support and route wires of a wire bundle between electrical components, the wire tray comprising:
   tray walls defining a channel configured to receive corresponding wires of the wire bundle, the tray walls comprising a first side wall, a second side wall opposite the first side wall and a bottom wall extending between the first and second side walls;
   a cover hingedly coupled to the first side wall at a hinge, the cover extending across a top of the channel between the first and second side walls, the cover having a primary latch latchably coupled to the second side wall to secure the cover to the second side wall, the cover having a secondary latch separate from the hinge and engaging the first side wall to secure the cover to the first side wall.

2. The wire tray of claim 1, further comprising a bridge spanning the channel between the first and second side walls, the bridge being recessed below the top of the channel below the cover, the cover having a protrusion extending into the channel below the top of the channel, the bridge and the protrusion each engaging outer jackets of corresponding wires forcing the wires to follow a tortuous path in the channel over the bridge and under the protrusion to capture the wires between the protrusion and the bridge.

3. The wire tray of claim 1, further comprising wire cradles extending below the bottom wall, each wire cradle having a cradle channel open to the channel, the cradle channel being open at a front of the wire cradle, each wire cradle receiving a corresponding wire of the wire bundle and routing the wire below the bottom wall to exit the wire tray.

4. The wire tray of claim 1, wherein the cover and tray walls are made of the same dielectric material, the cover being co-molded and integral with the tray walls.

5. The wire tray of claim 1, wherein the hinge is a living hinge, the cover being rotated about the living hinge between an open position and a closed position.

6. The wire tray of claim 1, the hinge connecting the cover to the first side wall at an exterior of the wire tray, the first sidewall including a slot open to the channel, the first side wall including a shoulder at a top of the slot, the secondary latch being received in the slot when the cover is closed such that the shoulder blocks the secondary latch from emerging from the slot.

7. The wire tray of claim 1, wherein the primary latch engages an exterior of the second side wall, the secondary latch engaging an interior of the first side wall in the channel.

8. The wire tray of claim 1, wherein the cover includes a first side and a second side, the primary latch extending from the first side, the secondary latch extending from the second side, the primary latch stopping vertical movement of the first side of the cover and the secondary latch stopping vertical movement of the second side of the cover.

9. The wire tray of claim 1, wherein the cover includes a bottom surface, the bottom surface engaging the wires to hold the wires in the channel by an interference fit to limit slippage between the wires and the wire tray.

10. The wire tray of claim 1, wherein the cover includes a rail fitting in the channel and extending below the top of the channel, the secondary latch extending from the rail.

11. A wire harness assembly comprising:
   a wire bundle having a plurality of wires connected between corresponding electrical components, the wires having outer jackets; and
   a wire tray receiving the wire bundle, the wire tray comprising:
   tray walls defining a channel receiving and routing the wires therein, the tray walls comprising a first side wall and a second side wall opposite the first side wall with a bridge spanning the channel between the first and second side walls, the bridge being recessed below a top of the channel;
   a cover extending across the top of the channel between the first and second side walls, the cover being positioned over the bridge, the cover having a protrusion extending into the channel below the top of the channel, the bridge and the protrusion each engaging outer jackets of corresponding wires forcing the wires to follow a tortuous path in the channel over the bridge and under the protrusion to capture the wires being captured between the protrusion and the bridge.

12. The wire harness assembly of claim 11, wherein the cover is hingedly coupled to the first side wall.

13. The wire harness assembly of claim 11, wherein the cover comprises a rail received in the channel and extending below a rail extending from the first side wall at the top of the channel, the protrusion extending from the rail and positioned below the rail.

14. The wire harness assembly of claim 11, wherein the portions of the wires between the bridge and the protrusion are angled transverse with respect to the longitudinal axis of the channel.

15. The wire harness assembly of claim 11, wherein the portions of the wires passing over the bridge are vertically above the portions of the wires passing under the protrusion.

16. The wire harness assembly of claim 11, wherein the protrusion is axially offset along a longitudinal axis of the channel with respect to the bridge, the wires following a sine wave path through the channel from the bridge to the protrusion.

17. The wire harness assembly of claim 11, wherein the bridge is a first bridge, the wire tray having a second bridge axially offset along a longitudinal axis of the channel with respect to the first bridge, the protrusion being approximately axially centered between the first and second bridges.

18. The wire harness of assembly claim 11, wherein the wires are held between the bridge and the protrusion by an interference fit to limit slippage between the wires and the wire tray.

19. A wire harness assembly comprising:
   a wire bundle having a plurality of wires connected between corresponding electrical components; and
   a wire tray receiving the wire bundle, the wire tray comprising:
   tray walls defining a channel receiving and routing the wires therein, the tray walls comprising a first side wall, a second side wall opposite the first side wall and a bottom wall extending between the first and second side walls;
   a cover extending across the top of the channel between the first and second side walls; and
   wire cradles extending from the bottom wall at a downward angle to an exit position below the bottom wall, each wire cradle having a cradle channel open to the channel, the cradle channel being open at a front of the wire cradle, each wire cradle receiving a corresponding wire of the wire bundle and routing the wire below the bottom wall for termination to the corresponding electrical component.

20. The wire harness assembly of claim 19, wherein the channel extends along a longitudinal axis, the cradle channels extending generally parallel to the longitudinal axis and being laterally offset with respect to the channel such that the corresponding wire has a double bend to transition into the cradle of the channel.

21. The wire harness assembly of claim 19, wherein the wires are bent into the cradle channel in a horizontal direction and in a vertical direction to limit slippage between the wires and the wire tray.

22. The wire harness assembly of claim 19 wherein the cradle includes a retention tab across the front of the cradle channel to capture the wire in the cradle channel.

23. The wire harness assembly of claim 19, wherein the cradle includes a base wall vertically offset below the bottom wall of the channel to support the wire at a bottom of the cradle.

24. The wire harness assembly of claim 23, wherein the wire is terminated to the corresponding electrical component generally co-planar with the bottom of the cradle.

* * * * *